US007924793B2

(12) United States Patent
Savoor et al.

(10) Patent No.: US 7,924,793 B2
(45) Date of Patent: Apr. 12, 2011

(54) METHODS AND APPARATUS TO MANAGE BANDWIDTH IN A WIRELESS NETWORK

(75) Inventors: Raghvendra Gurudath Savoor, Walnut Creek, CA (US); Kevin Meng, San Ramon, CA (US); Canhui Ou, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 688 days.

(21) Appl. No.: 11/561,490

(22) Filed: Nov. 20, 2006

(65) Prior Publication Data

US 2008/0117836 A1 May 22, 2008

(51) Int. Cl.
*H04W 4/00* (2009.01)
(52) U.S. Cl. .......................... 370/338; 370/254; 370/468
(58) Field of Classification Search .................. 370/338, 370/254, 468
See application file for complete search history.

(56) References Cited

U.S. PATENT DOCUMENTS

| 2003/0210672 | A1 | 11/2003 | Cromer et al. | |
|---|---|---|---|---|
| 2005/0120140 | A1* | 6/2005 | Bodlaender | 709/249 |
| 2005/0147073 | A1 | 7/2005 | Hietalahti et al. | |
| 2006/0072583 | A1 | 4/2006 | Sanda et al. | |
| 2006/0126533 | A1 | 6/2006 | Wang | |
| 2006/0153122 | A1* | 7/2006 | Hinman et al. | 370/328 |
| 2006/0165103 | A1 | 7/2006 | Trudeau et al. | |
| 2006/0177063 | A1 | 8/2006 | Conway et al. | |
| 2006/0268767 | A1* | 11/2006 | Sato et al. | 370/328 |
| 2007/0195818 | A1* | 8/2007 | Stephenson et al. | 370/468 |
| 2008/0097858 | A1* | 4/2008 | Vucina et al. | 705/14 |

OTHER PUBLICATIONS

Salkintzis et al, "Seamless Continuity of Real-Time Video Across UMTS and WLAN Networks: Challenges and Performance Evaluation", IEEE Wireless Communications, Jun. 2005.*
International Bureau, "International Preliminary Report on Patentability," for counterpart PCT Application Serial No. PCT/US2007/076759 issued on May 26, 2009, 10 pages.
Juniper Networks, Juniper Networks NetScreen-5GT Series, Jul. 2006, 4 pages.
Brian McConnell, "Dual SSID Wireless Access Points?", O'Reilly Emerging Telephony, Mar. 6, 2006, 3 pages.
Ray Zeisz, Matt Keil, Jae Lee, "Secure Wireless Networks for Distributed Remote Sites: Introducing the Juniper Networks for Distributed Remote Sites", Juniper Networks, Inc., Mar. 2005, 12 pages.
FON, downloaded from http://en.fon.com/ on Dec. 14, 2006, 1 page.
Sharemywifi.com, downloaded from http://sharemywifi.com/ on Dec. 14, 2006, 2 pages.

(Continued)

*Primary Examiner* — Barry W Taylor
(74) *Attorney, Agent, or Firm* — Hanley, Flight & Zimmerman, LLC

(57) ABSTRACT

Methods and apparatus to manage bandwidth in a wireless network are disclosed. For a wireless network that includes a wireless access point supporting a private service set identifier (SSID) and a public SSID, a disclosed example apparatus comprises a policy interface to receive a value representative of a permissible public bandwidth accessible via the public SSID, and a bandwidth allocator to control usage of the permissible public bandwidth, wherein the bandwidth allocator and the policy interface are physically separate from the wireless access point.

18 Claims, 7 Drawing Sheets

OTHER PUBLICATIONS

International Searching Authority, "Invitation to Pay Additional Fees and Communication Relating to the Results of the Partial International Search," for counterpart PCT Application Serial No. PCT/US2007/076759 mailed on May 15, 2008 (5 pages).

Dimitriadis, G. et al., "Seamless Continuity of Real-Time Video Across UMTS and WLAN Networks: Challenges and Performance Evaluation," IEEE Personal Communications, IEEE Communications Society, US, vol. 12, No. 3, Jun. 1, 2005, pp. 8-18.

International Searching Authority, "International Search Report," for counterpart PCT Application Serial No. PCT/US2007/076759 mailed on Aug. 8, 2008 (9 pages).

International Searching Authority, "Written Opinion of the International Searching Authority," for counterpart PCT Application Serial No. PCT/US2007/076759 mailed Aug. 8, 2008 (9 pages).

\* cited by examiner

METHODS AND APPARATUS TO MANAGE BANDWIDTH IN A WIRELESS NETWORK

FIELD OF THE DISCLOSURE

This disclosure relates generally to wireless networks and, more particularly, to methods and apparatus to manage bandwidth in a wireless network.

BACKGROUND

Wireless networks that employ dual service set identifier (SSID) wireless access points are gaining popularity. Such dual SSID wireless access points typically support a public SSID and a private SSID to enable sharing of access to wireless services and/or the Internet. Example wireless networks are based upon the Institute of Electrical and Electronics Engineers (IEEE) 802.11 family of standards (a.k.a. WiFi).

In some examples, service providers can increase their revenue by increasing the utilization of deployed access points to as many users as possible. For example, by enabling a public SSID on wireless access points owned and/or operated by the service provider that previously provided private SSID access to the service provider's subscribers, the service provider can gain additional revenue as a result of providing public access to its wireless access points. Moreover, by entering into agreements with other service providers and/or access point owners who mutually agree to enable a public SSID, a service provider can increase the number of access points by which its private subscribers can access wireless and/or Internet services. For example, a service provider may enter into an agreement with one or more owners and/or operators of one or more public locations to gain access to their access point(s), thereby extending the geographic region serviced by the service provider. However, in many instances, the bandwidth available to couple a dual SSID access point to the Internet and/or the service provider's network is limited. As such, the enablement of a public SSID by a service provider has the potential to interfere with the use of an access point by a private subscriber of the service provider.

DETAILED DESCRIPTION

Methods and apparatus to manage bandwidth in a wireless network are disclosed. For a wireless network that includes a wireless access point supporting a private service set identifier (SSID) and a public SSID, a disclosed example apparatus includes a policy interface to receive a value representative of a permissible public bandwidth accessible via the public SSID, and a bandwidth allocator to control usage of the permissible public bandwidth, wherein the bandwidth allocator and the policy interface are physically separate from the wireless access point. For a wireless communication system that includes a policy manager and a wireless access point supporting a private and a public service set identifier (SSID), another disclosed example apparatus includes a data structure defining a first bandwidth allocated to the public SSID and a second bandwidth allocated to the private SSID, and a memory to store the data structure. A disclosed example wireless devices includes a wireless modem to establish a first connection to a first access point of a wireless network, and a bandwidth agent to perform a transmission control protocol (TCP) split to establish a second connection to a second access point of the wireless network to replace the first connection when the first connection is revoked.

A disclosed example method includes receiving at a policy manager a policy for a public service set identifier (SSID) for one or more wireless access points, and configuring one or more bandwidths for one or more communication paths between a broadband remote access server (BRAS) and respective ones of the one or more wireless access points based upon the policy. Another disclosed example method includes receiving a bandwidth revocation notice at a user device via a first connection to a first access point of a wireless network, and performing a split to establish a second connection of the user device to a second access point of the wireless network to replace the first connection. Yet another example disclosed method includes receiving at a broadband remote access server (BRAS) data to be transmitted to a wireless user device, determining if a bandwidth is allocatable to the data based upon a service set identifier (SSID) associated with the data, and when the bandwidth is allocatable, transporting the data to the wireless user device using a virtual local area network (LAN) associated with the SSID.

Figure 1:
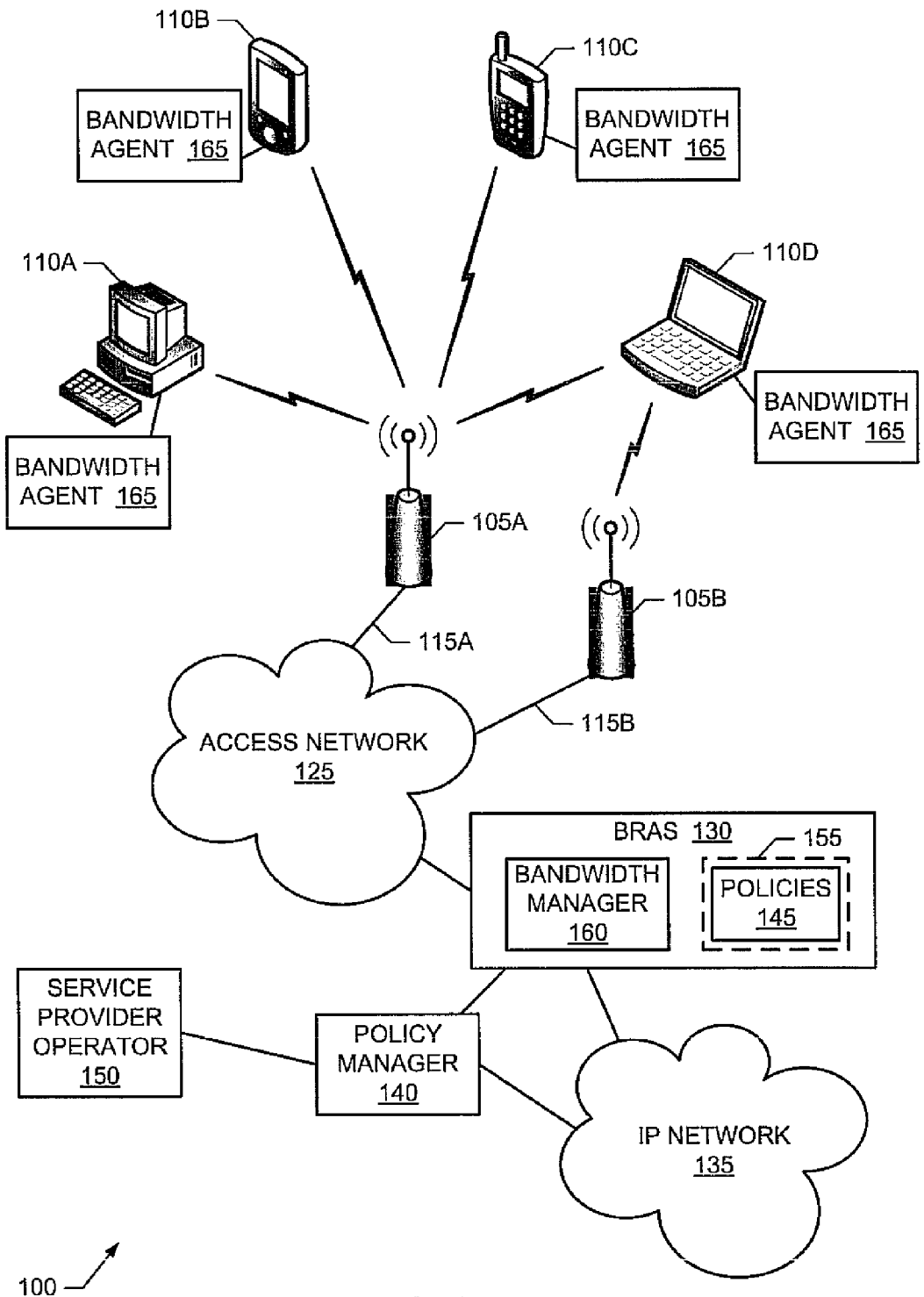
FIG. 1 is a diagram of an example wireless network constructed in accordance with the teachings of the invention.

FIG. 1 is a schematic diagram of an example wireless network 100. To provide wireless data and/or communication services (e.g., telephone services, Internet services, data services, messaging services, instant messaging services, electronic mail (email) services, chat services, video services, audio services, gaming services, etc.), the example wireless network 100 of FIG. 1 includes any number of access points (two of which are illustrated in FIG. 1 with reference numbers 105A and 105B), and any number and/or type(s) of fixed-location, substantially fixed-location and/or mobile wireless user devices (four of which are respectively designated in FIG. 1 with reference numerals 110A, 110B, 110C and 110D). Example mobile user devices include a personal digital assistant (PDA) 110B, an MP3 player such as an iPod®, a wireless telephone 110C (e.g., a cellular phone, a voice over Internet Protocol (VoIP) phone, a smart phone, etc.), a laptop computer 110D with wireless communication capabilities, etc. Example fixed-location or substantially fixed-location user devices include, for example, a desktop personal computer (PC) 110A with wireless communication capabilities.

The example access points 105A, 105B and/or the example user devices 110A-D of FIG. 1 are implemented in accordance with one or more past, present and/or future wired and/or wireless communication standards and/or specifications (e.g., one or more past, present and/or future standards from the Institute of Electrical and Electronics Engineers (IEEE) 802.11x family of standards) and/or implement features from one or more of those standards and/or specifications. Moreover, the example access points 105A, 105B and/or any or all of the example user devices 110A-D may implement a similar and/or a different set, subset and/or combination of the IEEE 802.11x standards as the access points 105A, 105B and/or any of the other user devices 110A-D.

In the example of FIG. 1, to allow the plurality of user devices 110A-D to communicate with remote devices and/or servers, each of the example access points 105A, 105B is communicatively coupled via a respective communication path 115A, 115B to, for example, any number and/or type(s) of access networks, one of which is illustrated in FIG. 1 with reference numeral 125. The example communication paths 115A, 115B and the example access network 125 of FIG. 1 communicatively couples the access points 105A, 105B to any number and/or type(s) of access servers, such as a broadband remote access server (BRAS), one of which is shown with reference numeral 130.

The example communication paths 115A, 115B and/or the access network 125 of FIG. 1 are implemented by any number and/or type(s) of past, current and/or future communication network(s), communication system(s), communication device(s), transmission medium(s), protocol(s), technique(s), specification(s) and/or standard(s). For example, the example access points 105A, 105B may be coupled to the BRAS 130 via any type(s) of voice-band modem(s), digital subscriber line (DSL) modem(s), DSL access multiplexer (DSLAM), cable modem(s), cable modem termination system (CMTS), Ethernet transceiver(s), optical transceiver(s), IP virtual private network (VPN) connection(s), IEEE 802.11x (a.k.a. WiFi) transceiver(s), IEEE 802.16 (a.k.a. WiMax), access point(s), etc. implemented by and/or within the example access points 105A, 105B, the example communication paths 115A, 115B and/or the example access network 125. Moreover, the example access network 125 of FIG. 1 may extend geographically to include locations near to and/or encompassing any or all of the access points 105A, 105B and/or the user devices 110A-D. However, in general, a particular communication path 115A, 115B has a limited bandwidth, transmission speed, and/or reception speed that may used by a respective access point 105A, 105B to exchange data with the BRAS 130.

The example access network 125 of FIG. 1 may be implemented by any number and/or type(s) of communication devices, cables, networks, technologies and/or systems. Example access networks include any type of public switched telephone network (PSTN) systems, public land-mobile network (PLMN) systems, wireless distribution systems, wired or cable distribution systems, coaxial cable distribution systems, fiber-to-the-home networks, fiber-to-the-curb networks, fiber-to-the-pedestal networks, fiber-to-the-vault networks, fiber-to-the-neighborhood networks, Ultra High Frequency (UHF)/Very High Frequency (VHF) radio frequency systems, satellite or other extra-terrestrial systems, cellular distribution systems, power-line broadcast systems, and/or combinations and/or hybrids of these devices, systems and/or networks.

The example BRAS 130 of FIG. 1 controls and/or limits access of the user devices 110A-D to any number and/or type(s) of public and/or private Internet Protocol (IP) based networks, such as the Internet, one of which is illustrated in FIG. 1 with reference number 135. For example, the BRAS 130 may verify the identity of a user and/or user device 110A-D before the user and/or user device 110A-D is able to access services implemented by and/or provided by the example IP network 135.

To support both private users (e.g., subscribers of an owner and/or operator of an access point, and/or subscribers of a service provider) and public users, each of the example access points 105A, 105B of FIG. 1 supports at least a private service set identifier (SSID) and a public SSID. In general, a private user of an access point 105A, 105B is expected to access the access point 105A, 105B using a private SSID. However, the user and/or their user device 110A-D may alternatively use the public SSID. Because a service provider may operate more than one access point 105A, 105B, a user may be a private user for and/or at more than one access point 105A, 105B. For example, the service provider may offer services for a geographic region that includes more than one access point 105A, 105B, each of which may be used by a subscriber to access the IP network 135. However, for an access point 105A, 105B operated by a different service provider (or the same provider outside the same service provider but outside the private subscriber's geographic area), the user may be a public user and, thus, only be able to access the IP network 135 using that access point's public SSID. Even though each of the example access points 105A, 105B of FIG. 1 supports a public SSID and a private SSID, at any given time, a particular access point 105A, 105B may restrict access by public users. For example, during a generally low utilization time period for an access point 105A, 105B (e.g., during weekday mornings), the access point 105A, 105A and/or, more particularly, the BRAS 130 may be configured to allow public access via the public SSID. Likewise, during a high utilization time period (e.g., weekday evenings) access may be limited to private users. While the example access points 105A, 105B of FIG. 1 support a private and a public SSID, any or all of the access points 105A, 105B may implement and/or support any number of additional or alternative SSIDs.

Since each of the example access points 105A, 105B of FIG. 1 is respectively coupled to the example BRAS 130 via a single communication path 115A, 115B (e.g., a DSL connection), data associated with private and public users of a particular access point 105A, 105B share the bandwidth of the corresponding communication path 115A, 115B. To control and/or configure the utilization of the bandwidth shared by public and private users, the example wireless network 100 of FIG. 1 includes a policy manager 140. The example policy manager 140 of FIG. 1 sets one or more policies 145 that are utilized and/or implemented by the example BRAS 130 to control the access of a public user to one or more of the access points 105A, 105B. In some examples, a DSLAM and/or CMTS implemented by the example access network 125 and used to couple an access point 105A, 105B may enforce a portion of the policies 145. For example, the policies 145 may set and/or configure user policies at a DSLAM and/or CMTS to restrict the ability of public users to communicate with the BRAS 130. The policy manager 140 and/or the policies 145 may control usage of the access points 105A, 105B by public users on a per access point 105A, 105B bases, for all access points 105A, 105B owned and/or operated by the service provider, and/or on a time-of-day, day-of-week and/or day-of-year basis. In the example wireless network 100 of FIG. 1, the policy manager 140 and/or, more specifically, the example policies 145 may be set, configured and/or controlled by a service provider operator 150, such as technician, a customer service representative, and/or an installer. The example policies 145 for a particular access point 105A, 105B may also be set, configured and/or controlled by an owner and/or operator of the access point 105A, 105B. Example manners of implementing the example policy manager 140 of FIG. 1 are described below in connection with FIGS. 4 and 8. The example policies 145 of FIG. 1 are stored in any number and/or types(s) of machine accessible memories 155. An example data structure that may be used to implement the example policies 145 is described below in connection with FIG. 6.

In the illustrated example of FIG. 1, the access points 105A, 105B, the access network 125, the BRAS 130 and the policy manager 140 are owned and/or operated by a single service provider. That is, the service provider owns, operates, utilizes, implements and/or configures the policy manager 140, the BRAS 130, the access network 125 and/or the access points 105A, 105B to provide wireless access to the IP network 135 across any type(s) and/or size(s) of geographic area(s). Persons of ordinary skill in the art will readily recognize that any of the access points 105A, 105B, the access network 125, the BRAS 130 and/or the policy manager 140 may be owned and/or operated by more than one service provider. For example, a first service provider may own and/or operate the access network 125, while a second service provider owns and/or operates the access points 105A, 105B, the BRAS 130, and the policy manager 140. In another example, a service provider owns and/or operates the access network 125, the BRAS 130 and the policy manager 140, while a second entity owns and/or operates one or more of the access points 105A, 105B.

To control actual usage of bandwidth by public users of the example access points 105A, 105B, the example BRAS 130 of FIG. 1 includes a bandwidth manager 160. The example bandwidth manager 160 of FIG. 1 implements and/or enforces the policies 145 as specified, set and/or controlled by the example policy manager 140. In the example of FIG. 1, the bandwidth manager 160 limits utilization of one or more of the access points 105A, 105B by public users to, for example, ensure that private users have substantially full access to the capabilities of the access points 105A, 105B. To this end, the example bandwidth manager 160 implements one or more rules that limit the continuous and/or peak bandwidth usage by public users, to ensure that private users can utilize a, potentially different, continuous and/or peak bandwidth reserved for private users. For example, the policies 145 may specify that (a) the bandwidth reserved for private users is characterized as having a committed information rate (CIR) that is the minimum communication speed of the communication path between the BRAS 130 and an access point 105A, 105B, and a peak information rate (PIR) of the maximum speed of the communication path, and (b) the bandwidth allocatable to (i.e., permissible public bandwidth for) public users is characterized as having a CIR of zero and a PIR of the maximum speed. In such an example, public users are not guaranteed any access to the communication path since their associated CIR is zero. Likewise, private users may consume and/or utilize all of the bandwidth of the communication path 115A, 115B. In the example system 100 of FIG. 1, the bandwidth reserved for private users is shared by all private users currently connected to a particular access point 105A, 105B. That is, bandwidth is not managed and/or controlled on a per user and/or user device 110A-D basis. Likewise, all public users currently connected to a particular access point 105A, 105B shared the permissible public bandwidth.

The example bandwidth manager 160 of FIG. 1 controls the utilization of bandwidth in the direction from the BRAS 130 to the user devices 110A-D. However, the BRAS 130 and/or the access points 105A, 105B could likewise implement bandwidth management controlling bandwidth in the direction from the user devices 110A-D to the BRAS 130 using methods and/or apparatus similar to those described herein. Example manners of implementing the example bandwidth manager 160 of FIG. 1 are described below in connection with FIGS. 5 and 9.

As described below, the example bandwidth manager 160 of FIG. 1 may, additionally or alternatively, be used to implement and/or provide security and/or content filtering for users utilizing a public SSID. In particular, the example policies 145 of FIG. 1 could define and/or specify any number of services and/or service identifiers that public users are blocked from accessing (e.g., specific IP addresses, specific web sites, etc.). The example bandwidth manager 160 may, additionally or alternatively, record and/or log a list of services accessed by public users.

To identify and/or separate data associated with public users from data associated with private users, the example BRAS 130 and the example access points 105A, 105B of FIG. 1 use virtual local area network (vLAN) technologies, such as those defined in the IEEE 802.1Q standard. The example BRAS 130 and the example access points 105A, 105B transport data for public users (e.g., associated with a public SSID) in a first public vLAN and transport data for private users (e.g., associated with a private SSID) in a second private vLAN. To differentiate and/or allow easy control over the vLANs, each of the vLANs is configured with a priority that is set and/or controlled using a so-called "p-bit" associated with each vLAN. In the example network 100 of FIG. 1, the priority of the private vLAN is set higher than the priority of the public vLAN.

To manage the utilization of bandwidth by a public user, each of the example wireless user devices 110A-D of FIG. 1 includes a bandwidth agent 165. As illustrated in FIG. 1, any particular user device 110A-D may at any particular time have a geographic location such that the user device 110A-D can communicate with more than one of the access points 105A, 105B. As described below, when the usage of an access point 105A, 105B by public users is revoked (e.g., due to high utilization by private users and/or due to a policy change), if a particular user device 110A-D utilized by a public user has a nearby access point 105A, 105B that is allowing public users, the example bandwidth agents 165 of FIG. 1 establishes a communication session to the nearby access point 105A, 105B. In particular, the bandwidth agents 165 and the example policy manager 140 of FIG. 1 are configured to support and/or implement split transmission control protocol (TCP) to facilitate the establishment of the communication session without the user and/or an application implemented by and/or on the user device having been aware that a different access point 105A, 105B is now being used. In the example wireless network 100 of FIG. 1, the policy manager 140 suggests one or more nearby access points 105A, 105B with which the bandwidth agent 165 can attempt to establish a public communication session. If the particular user device 110A-D does not have a nearby access point 105A, 105B that is allowing public users, the example bandwidth agent 165 of FIG. 1 notifies the user of the loss of public access by, for example, displaying a pop window and/or a message for viewing by the user. Example manners of implementing any or all of the example bandwidth agents 165 are described below in connection with FIGS. 3 and 6.

While the example user devices 110A-D of FIG. 1 include bandwidth agents 165 that implement similar functionality and/or contain similar devices, circuits and/or logic, a particular bandwidth agent 165 implemented by any of the user devices 110A-D may differ in any way from a bandwidth agent 165 implemented by any of the other user devices 110A-D. In some examples, a first bandwidth agent 165 implemented for a first user device 110A-D may include only a portion of the devices, circuits and/or logic implemented by another bandwidth agent 165 utilized in another user device 110A-D. For example, the first example bandwidth agent 165 may not support split TCP and, thus, may simply notify the user when public usage of an access point 105A, 105B is revoked and, thus, communication is terminated. Moreover, the bandwidth agents 165 may differ in the number and/or type(s) of features they include and/or perform.

While this disclosure refers to the example wireless network 100 of FIG. 1, the example access points 105A, 105B and/or the example user devices 110A-D of FIG. 1, the example wireless network 100 of FIG. 1 may be used to provide services to, from and/or between any alternative and/or additional wired and/or wireless communication devices (e.g., telephone devices, personal digital assistants (PDA), laptops, etc.). Additionally, although for purposes of explanation, the descriptions contained herein refer to the example wireless network 100, the example access points 105A, 105B and/or the example user devices 110A-D illustrated in FIG. 1, any additional and/or alternative type and/or number of communication systems, communication devices and/or communication paths may be used to implement a wireless network and/or to provide data and/or communication services. Moreover, while these descriptions reference the IEEE 802.11x family of standards, persons of ordinary skill in the art will appreciated that the methods and apparatus disclosed herein may be utilized for wireless networks operated in accordance with any past, present and/or future standards and/or specifications such as, for example, the IEEE 801.16x (a.k.a. WiMax) family of standards.

Figure 2:
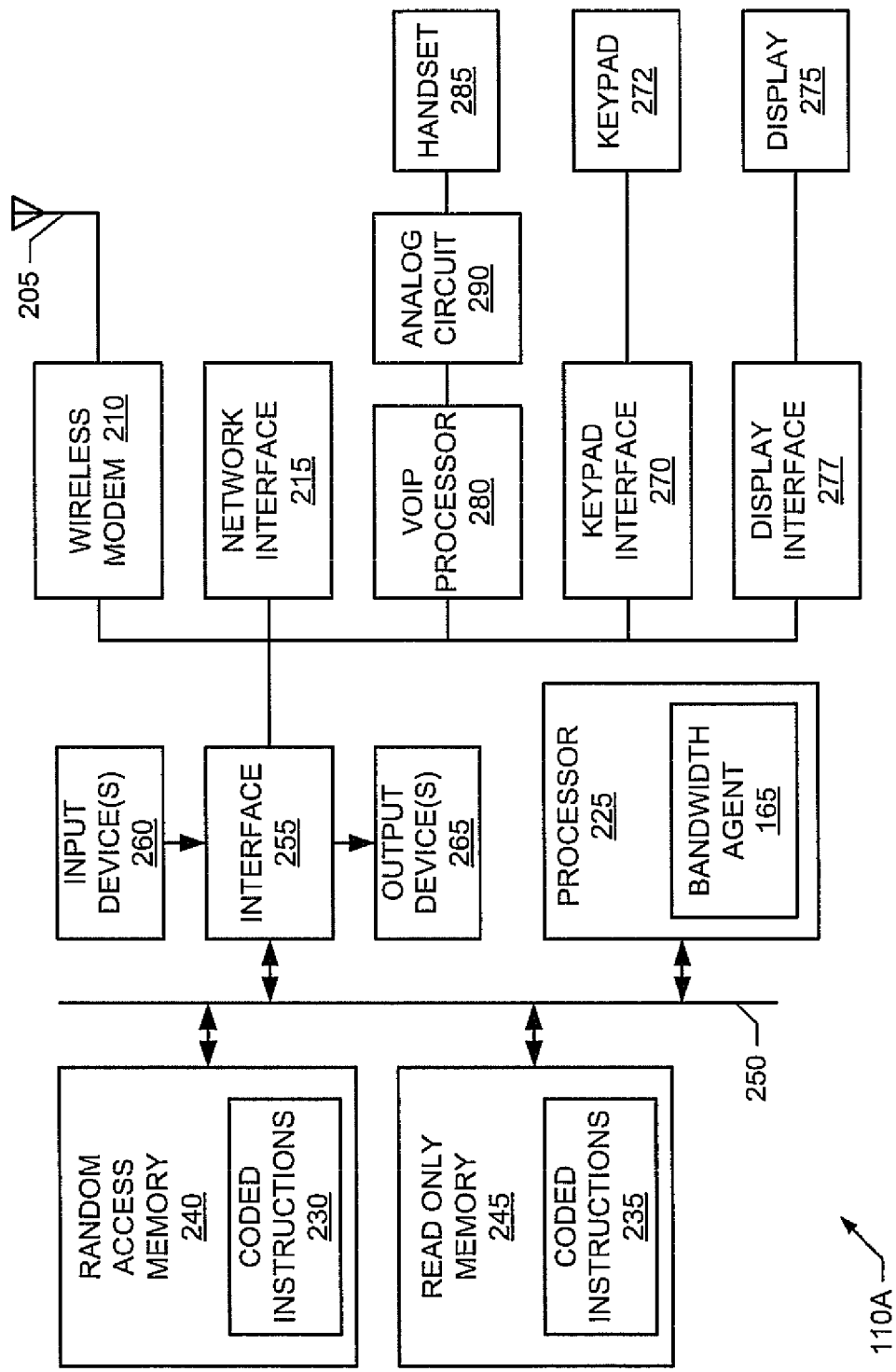
FIG. 2 illustrates an example manner of implementing any or all of the example user devices of FIG. 1.

FIG. 2 illustrates an example manner of implementing any or all of the example user devices 110A-D of FIG. 1. However, while FIG. 2 can represent one or more of the example user devices 110A-D, for ease of discussion, in the following the example device of FIG. 2 will be referred to as user device 110A. To implement wireless communications with the example access points 105A, 105B and/or one or more of the example user devices 110A-D of the example wireless network 100 of FIG. 1, the example user device 110A of FIG. 2 includes any number and/or type(s) of radio frequency (RF) antennas 205 and any number and/or type(s) of wireless modems 210. The example RF antenna 205 and the example wireless modem 210 of FIG. 2 are able to receive, demodulate and decode WLAN and/or WiFi signals transmitted to and/or within the example wireless network 100 of FIG. 1. Likewise, the wireless modem 210 and the RF antenna 205 are able to encode, modulate and transmit WLAN and/or WiFi signals from the example user device 110A to the example access points 105A, 105B and/or any or all of the example user devices 110A-D of the example wireless network 100 of FIG. 1. Thus, as commonly referred to in the industry, the example RF antenna 205 and the example wireless modem 210 collectively implement the physical layer (a.k.a. PHY) for the example user device 110A of FIG. 2.

To communicatively couple the example user device 110A of FIG. 2 to another device and/or network (e.g., a local area network (LAN), a modem, a router, a bridge and/or a gateway), the example user device 110A of FIG. 2 includes any number and/or type(s) of network interfaces 215. However, a user device 110A-D need not include a network interface 215. The example network interface 215 of FIG. 2 operates in accordance with any of the IEEE 802.3x (a.k.a. Ethernet) family of standards.

To manage the utilization of bandwidth by a public user, the example user device 110A of FIG. 2 includes a bandwidth agent 165. As illustrated in FIG. 1, any particular user device 110A-D may at any particular time have a geographic location such that the user device 110A-D can communicate with more than one of the access points 105A, 105B. As described below, when the usage of an access point 105A, 105B by public users is revoked (e.g., due to high utilization by private users and/or due to a policy change), if a particular user device 110A-D utilized by a public user has a nearby access point 105A, 105B that is allowing public users, the example bandwidth agent 165 of FIG. 2 establishes a communication session to the nearby access point 105A, 105B. In particular, the bandwidth agent 165 and the example policy manager 140 of FIG. 1 are configured to support and/or implement split TCP to facilitate the establishment of the communication session without the user and/or an application implemented by and/or on the user device having been aware that a different access point 105A, 105B is now being used. In the example wireless network 100 of FIG. 1, the policy manager 140 suggests one or more nearby access points 105A, 105B with which the example bandwidth agent 165 of FIG. 2 can attempt to establish a public communication session. If the particular user device 110A-D does not have a nearby access point 105A, 105B that is allowing public users, the example bandwidth agent 165 of FIG. 2 notifies the user of the loss of public access by, for example, displaying a pop window and/or a message for viewing by the user. Example manners of implementing the example bandwidth agent 165 are described below in connection with FIGS. 3 and 6.

To implement the example bandwidth agent 165 using one or more of any number and/or type(s) of software, firmware, processing thread(s) and/or subroutine(s), the example user device 110A of FIG. 2 includes a processor 225. The example processor 225 of FIG. 2 may be one or more of any type(s) of processors such as, for example, a microprocessor, a microcontroller, a digital signal processor (DSP), an advanced reduced instruction set computing (RISC) machine (ARM) processor, etc. The example processor 225 executes coded instructions 230 and/or 235 which may be present in a main memory of the processor 225 (e.g., within a random-access memory (RAM) 240 and/or a read-only memory (ROM) 245) and/or within an on-board memory of the processor 225. The example processor 225 may execute, among other things, the example machine accessible instructions illustrated in FIG. 3 to implement the example bandwidth agent 165.

While in the illustrated example of FIG. 2, the example bandwidth agent 165 is implemented by executing one or more type(s) of software, firmware, processing thread(s) and/or subroutine(s) with the example processor 225, the example bandwidth agent 165 of FIG. 2 may be, additionally or alternatively, implemented using any number and/or type(s) of application specific integrated circuit(s) (ASIC(s)), programmable logic device(s) (PLD(s)), field programmable logic device(s) (FPLD(s)), discrete logic, hardware, firmware, etc. Also, some or all of the example bandwidth agent 165 may be implemented manually or as any combination of any of the foregoing techniques. For example, the bandwidth agent 165 may be implemented by any combination of firmware, software and/or hardware.

The example processor 225 of FIG. 2 is in communication with the main memory (including the RAM 240 and the ROM 245) via a bus 250. The example RAM 240 may be implemented by DRAM, SDRAM, and/or any other type of RAM device. The example ROM 245 may be implemented by flash memory and/or any other desired type of memory device. Access to the memories 240 and 245 is typically controlled by a memory controller (not shown). The RAM 240 may be used, for example, to store a first IP address presented to applications and/or devices implemented by the user device 110A and a second IP address used to access an access point 105A, 105B.

The example user device 110A of FIG. 2 also includes any number and/or type(s) of interface circuits 255. The example interface circuit 255 of FIG. 2 may implement any number and/or type(s) of interfaces, such as external memory interface(s), serial port(s), general purpose input/output port(s), etc. Additionally or alternatively, the interface circuit 255 may communicatively couple the example wireless modem 210 and/or the network interface 215 with the processor 225 and/or the example bandwidth agent 165.

In the example of FIG. 2, any number and/or type(s) of input devices 260 and any number and/or type(s) of output devices 265 are connected to the interface circuit 255. To facilitate user inputs via any type of keypad 250, the example user device 110A of FIG. 2 includes any type of keypad interface 270. The example keypad interface 270 of FIG. 2 electrically couples and/or translates electrical signals conveying key press information from the example keypad 172 to the example processor 225.

To provide output information to a user via any number and/or type(s) of displays 275, the example user device 110A of FIG. 2 includes any number and/or type(s) of display interfaces 277. An example display interface 277 receives information (e.g., alphanumeric characters) to be displayed from the example processor 225 and creates electrical signals suitable for displaying the information on the example display 275. An example display 275 is a liquid-crystal display (LCD) screen.

To implement voice over IP (VoIP) services, the example user device 110A of FIG. 2 includes a VoIP processor 280. However, a user device 110A-D need not include a VoIP processor 280. The example VoIP processor 280 of FIG. 2 implements, among other things, session control, VoIP protocols, a SIP user agent, and a coder (not shown) to encode audio and/or video signals, a decoder (not shown) to decode received audio and/or video signals, a packetizer (not shown) to packetize encoded data and a de-packetizer (not shown) to de-packetize encoded data.

To electrically couple signals (e.g., speech signals) between a handset 285 and the example VoIP processor 280, the example user device 110A of FIG. 2 includes any number and/or type(s) of analog circuits 290. An example analog circuit 290 includes any number and/or type(s) of filter(s), analog-to-digital converter(s) and/or digital-to-analog converter(s) to convert between analog signals sent to and/or received from an example handset 285 and digital signals sent to and/or received from the example VoIP processor 280. The handset 285 can be corded or cordless.

To this end, the example analog circuit 290 of FIG. 2 may implement any number and/or type(s) of wireless communication technologies to communicatively couple the example VoIP processor 280 with any type of cordless handset 285. Moreover, the example analog circuit 290 of FIG. 2 may, additionally or alternatively, implement any number and/or type(s) of subscriber line interface circuits (SLICs) that allow any number and/or type(s) of corded and/or cordless PSTN-based telephones (not shown) to be electrically coupled to the example VoIP processor 280 of FIG. 2. The latter example could be used, for instance, in implementations where the example user device 110A is located in and/or implements a VoIP analog telephone adapter (ATA) and/or a VoIP residential gateway.

While an example manner of implementing any or all of the example user devices 110A-D of FIG. 1 is illustrated in FIG. 2, a user device 110A-D may be implemented using any number and/or type(s) of other and/or additional element(s), processor(s), device(s), component(s), circuit(s), module(s), interface(s), etc. Further, the element(s), processor(s), device(s), component(s), circuit(s), module(s), element(s), interface(s), etc. illustrated in FIG. 2 may be combined, divided, re-arranged, eliminated and/or implemented in other ways. Additionally, the example interface 255, the example wireless modem 210, the example network interface 215, the example bandwidth agent 165, the example VoIP processor 280 and/or, more generally, the example user device 110A of FIG. 2 may be implemented as any combination of firmware, software, logic and/or hardware. Moreover, the example user device 110A may include additional processor(s), device(s), component(s), circuit(s), interface(s) and/or module(s) than those illustrated in FIG. 2 and/or may include more than one of any or all of the illustrated processor(s), device(s), component(s), circuit(s), interface(s) and/or module(s).

Figure 3:
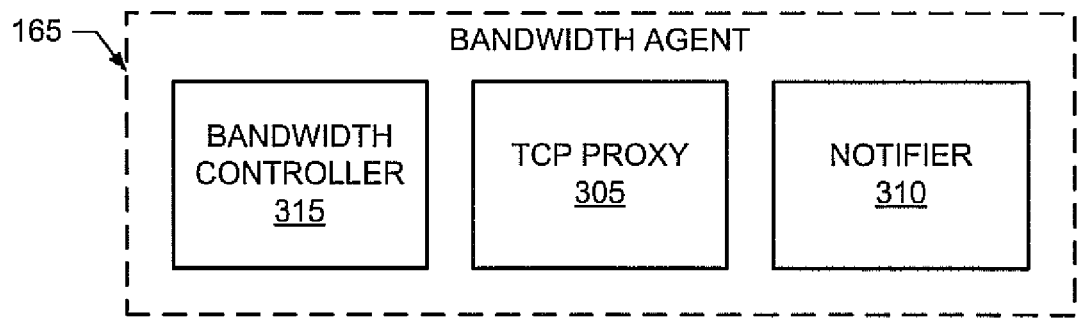
FIG. 3 illustrates an example manner of implementing the example bandwidth agent of FIGS. 1 and 2.

FIG. 3 illustrates an example manner of implementing any or all of the example bandwidth agents 165 of FIGS. 1 and 2. To implement split TCP, the example bandwidth agent 165 of FIG. 3 includes a TCP proxy 305. The example TCP proxy 305 of FIG. 3 presents a first IP address to other devices and/or applications implemented by and/or within a user device 110A-D that includes a bandwidth agent 165, and uses a second IP address to communicate with and/or via an access point 105A, 105B to which the user device 110A-D is communicatively coupled. By using the two IP addresses, the example TCP proxy 305 can implement split TCP. In particular, when a connection to a first access point 105A, 105B needs to be terminated and a second connection is established to a second access point 105A, 105B, only the second IP addressed used to communicate with and/or via the access points 105A, 105B needs to be changed. As such, other devices and/or applications implemented by and/or within the user device 110A-D need not be aware and/or be notified that the second IP address has changed. That is, the other devices and/or applications can continue using the first IP address presented by the TCP proxy 305, with the TCP proxy 305 translating between the first and the second IP addresses for communications to and/or from the devices and/or applications.

To notify a user that public access to an access point 105A, 105B has been revoked, the example bandwidth agent 165 of FIG. 3 includes a notifier 310. The example notifier 310 of FIG. 3 notifies a user via, for example, a pop-up window, a message, an audible sound, etc. that a public SSID used to access an access point 105A, 105B is no longer valid. The example notifier 310 may also present one or more explanations as to why public access was revoked and/or one or more possible solutions to restore communications (e.g., try the coffee shop next door). The example notifier 310 may also present one or more pop-up windows, messages, etc. when a user of a user device 110A-D attempts to access a service and/or server that is configured to be blocked by a BRAS 130. When a public SSID is revoked and if the bandwidth agent 165 is able to re-establish a public connection via another access point 105A, 105B, the notifier 310 need not notify the user. Instead, the TCP proxy 305 can reestablish the connection with the other access point 105A, 105B without the user or other applications and/or devices of the user device 110A-D being aware that a change has occurred.

To control the example bandwidth agent 165 of FIG. 3, the example bandwidth agent 165 includes a bandwidth controller 315. The example bandwidth controller 315 of FIG. 3 receives and/or processes notifications from an access point 105A, 105B and/or a BRAS 130 concerning the usage of public SSIDs. For example, the bandwidth controller 315 may receive a message notifying the user device 110A-D that access via a particular public SSID is being terminated. Such a message may, in some examples, include an identification and/or public SSID of a nearby access point 105A, 105B to which the user device 110A-D may be able to reestablish the communication session. If no such alternative access point 105A, 105B is available and/or a new session to the alternative access point 105A, 105B can not be established, the example bandwidth controller 315 directs the example notifier 310 to notify a user of the user device 110A-D that public access has been revoked and to provide one or more possible solutions. If an alternative access point 105A, 105B is available and the bandwidth controller 315 is able to successfully connect to and/or via the alternative access point 105A, 105B, the example bandwidth controller 315 configures the example TCP proxy 305 with the new IP address.

While an example bandwidth agent 165 is illustrated in FIG. 3, the bandwidth agent 165 may be implemented using any number and/or type(s) of alternative and/or additional processors, devices, components, circuits, modules, interfaces, etc. Further, the processors, devices, components, circuits, modules, elements, interfaces, etc. illustrated in FIG. 3 may be combined, re-arranged, eliminated and/or implemented in any other way. Additionally, the example TCP proxy 305, the example notifier 310, the example bandwidth controller 315 and/or, more generally, the example bandwidth agent 165 may be implemented as any combination of firmware, software, logic and/or hardware. Moreover, the example bandwidth agent 165 may include additional processors, devices, components, circuits, interfaces and/or modules than those illustrated in FIG. 3 and/or may include more than one of any or all of the illustrated processors, devices, components, circuits, interfaces and/or modules.

Figure 4:
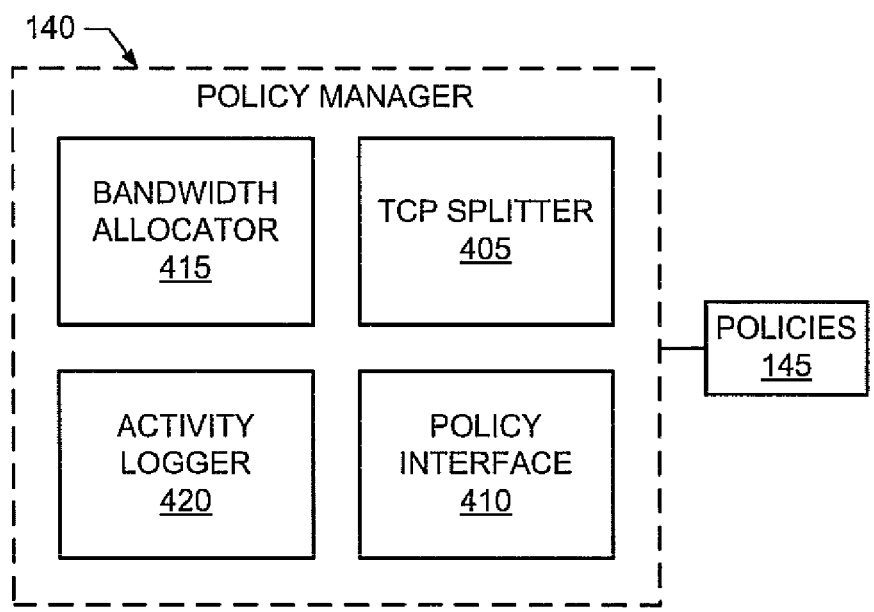
FIG. 4 illustrates an example manner of implementing the example policy manager of FIG. 1.

FIG. 4 illustrates an example manner of implementing the example policy manager 140 of FIG. 4. To implement split TCP, the example policy manager 140 of FIG. 4 includes a TCP splitter 405. The example TCP splitter 405 of FIG. 4 translates between a first IP address used to access a service and/or server (e.g., implemented by and/or within the IP network 135 of FIG. 1) and a second IP address that represents an IP address assigned to a particular user device 110A-D. In particular, when a connection between a user device 110A-D and a first access point 105A, 105B is terminated and a second connection is established between the user device 110A-D and a second access point 105A, 105B, the second IP address typically changes due to the establishment of the new connection and, thus, a new IP address is assigned to the user device 110A-D. During communication with a particular service and/or server, the example TCP proxy 405 translates between the first and the second IP addresses. In this way, communication between the service and/or server are not impacted even though the user device 110A-D is now communicatively coupled to a different access point 110A-D and, thus, assigned a different IP address.

To provide an interface to configure the policies 145, the example policy manager 140 of FIG. 4 includes any number and/or type(s) of policy interfaces 410. The example policy interface 410 implements any number and/or type(s) of interfaces that allow a) a service provider operator (e.g., the operator 150 of FIG. 1), such as a technician, a customer service representative and/or an installer, and/or b) an operator and/or owner of an access point 105A, 105B to set, configure and/or modify the policies 145. In some examples, the policy interface 410 is implemented by one or more web-based interfaces. Additionally or alternatively, the example policy interface 410 may implement any type of customized interfaces.

To determine bandwidth allocations, the example policy manager 140 of FIG. 4 includes a bandwidth allocator 415. The example bandwidth allocator 415 of FIG. 4 determines CIR and PIR values for public and private communication sessions based upon one or more values stored in the policies 145 and/or based upon one or more inputs received via the policy interface 410. For example, the bandwidth allocator 415 may receive an input from an owner of an access point 105A, 105B that indicates that the bandwidth available for public usage at the access point 105A, 105B is to be reduced. In response to the input, the example bandwidth allocator 415 determines and/or selects a CIR and a PIR value for private sessions and a CIR and a PIR value for public sessions, and then updates the policies 145 for the access point 105A, 105B with the new values.

To track usage of services and/or servers by public users, the example policy manager 140 of FIG. 4 includes an activity logger 420. The example activity logger 420 of FIG. 4 records a list of services and/or servers accessed by public users. Such information may be compiled based upon information provided by a BRAS (e.g., the example BRAS 130 of FIG. 1) and/or based upon information provided by the example TCP splitter 405. The information logged by the activity logger 420 may be used, for example, for auditing, accounting and/or other lawful activities. In some examples, an anonymous version of the logged information may be provided to the owner and/or operator of an access point 105A, 105B.

While an example policy manager 140 is illustrated in FIG. 4, the policy manager 140 may be implemented using any number and/or type(s) of alternative and/or additional processors, devices, components, circuits, modules, interfaces, etc. Further, the processors, devices, components, circuits, modules, elements, interfaces, etc. illustrated in FIG. 4 may be combined, re-arranged, eliminated and/or implemented in other ways. Additionally, the example TCP splitter 405, the example policy interface 410, the example activity logger 420 and/or, more generally, the example policy manager 140 may be implemented as any combination of firmware, software, logic and/or hardware. Moreover, the example policy manager 140 may include additional processors, devices, components, circuits, interfaces and/or modules than those illustrated in FIG. 4 and/or may include more than one of any or all of the illustrated processors, devices, components, circuits, interfaces and/or modules.

Figure 5:
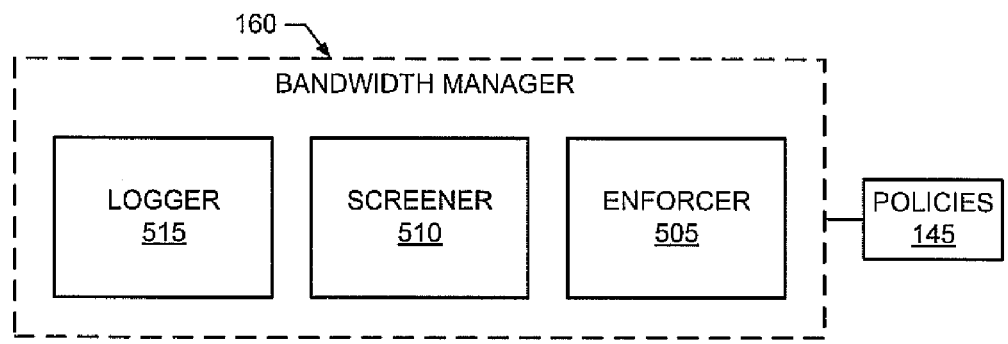
FIG. 5 illustrates an example manner of implementing the example bandwidth manager of FIG. 1.

FIG. 5 illustrates an example manner of implementing the example bandwidth manager 160 of FIG. 1. To enforce the policies 145, the example bandwidth manager 160 of FIG. 5 includes an enforcer 505. Using any method(s), algorithm(s), logic and/or rules, the example enforcer 505 of FIG. 5 limits the continuous and/or peak bandwidth usage of public users to ensure that private users can utilize a, potentially different, continuous and/or peak bandwidth usage allocated for private users. For example, the enforcer 505 may ensure that private users have access to at least the private CIR and the private PIR specified in the policies 145, and ensure that public users do not exceed the public PIR specified by the policies 145. As described above, the policies 145 may include variables that depend upon time-of-day, day-of-week, day-of-year, etc. Alternatively or additionally, the policies 145 may vary from access point to access point 105A, 105B.

The example enforcer 505 of FIG. 5 controls the utilization of bandwidth in the direction from the BRAS 130 to the user devices 110A-D. However, the enforcer 505, the BRAS 130 and/or the access points 105A, 105B could likewise implement bandwidth management for data from the user devices 110A-D to the BRAS 130 using methods and/or apparatus similar to those described herein.

If data for a public user would cause a communication path for an access point 105A, 105B (e.g., one of the example paths 115A, 115B of FIG. 1) to exceed the bandwidth allocated to and/or useable by public users, the example enforcer 505 of FIG. 5 queues the data for sending at a later timer. Additionally or alternatively, if sending the data would not ensure that the private CIR for a communication path can be met, the example enforcer 505 queues the data. If the data can be transmitted without affecting the bandwidth provisioned for private users and without exceeding limits configured for public users, the data is transmitted to the appropriate user device 110A-D.

To implement content filtering, the example bandwidth manager 160 of FIG. 5 includes a screener 510. The example screener 510 of FIG. 5 implements and/or provides security and/or content filtering for users utilizing a public SSID. In particular, when the example policies 145 of FIG. 1 define and/or specify any number of content screening parameters (e.g., services and/or server identifiers that public users are blocked from accessing, specific IP addresses, specify web sites, etc.), the example screener 510 ensures that such content screening parameters are enforced.

To log the activity of public users, the example bandwidth manager 160 of FIG. 5 includes a logger 515. The example logger 515 of FIG. 5 records and/or logs services and/or servers accessed by public users. Additionally, the logger 515 may record and/or log attempted access to blocked services and/or servers. The example logger 515 also provides the recorded and/or logged information to a policy manager (e.g., the example policy manager 140 of FIG. 1).

While an example bandwidth manager 160 is illustrated in FIG. 5, the bandwidth manager 160 may be implemented using any number and/or type(s) of alternative and/or additional processors, devices, components, circuits, modules, interfaces, etc. Further, the processors, devices, components, circuits, modules, elements, interfaces, etc. illustrated in FIG. 5 may be combined, re-arranged, eliminated and/or implemented in other ways. Additionally, the example enforcer 505, the example screener 510, the example logger 515 and/or, more generally, the example bandwidth manager 160 may be implemented as any combination of firmware, software, logic and/or hardware. Moreover, the example bandwidth manager 160 may include additional processors, devices, components, circuits, interfaces and/or modules than those illustrated in FIG. 5 and/or may include more than one of any or all of the illustrated processors, devices, components, circuits, interfaces and/or modules.

Figure 6:
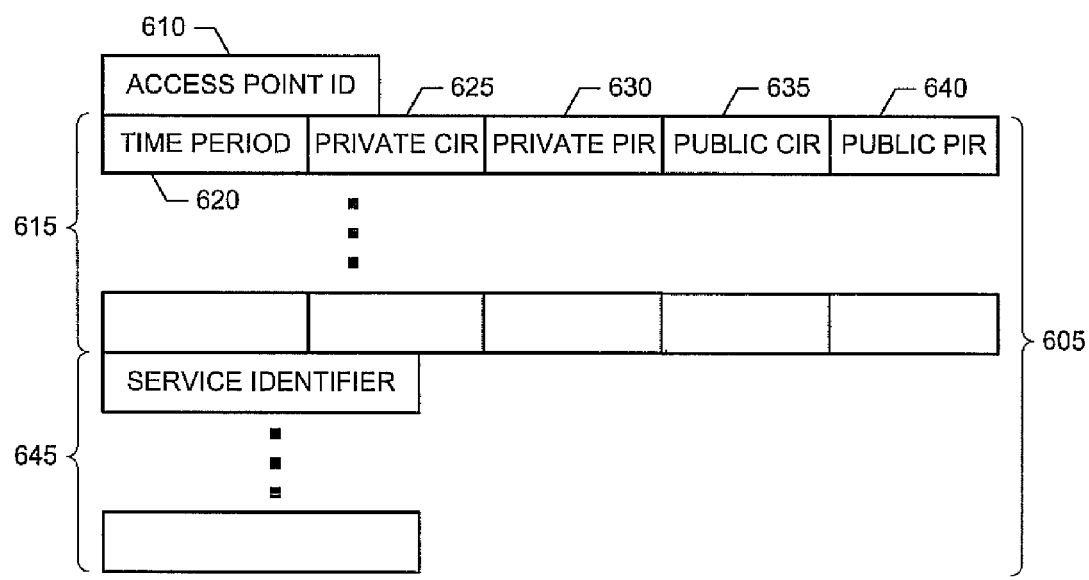
FIG. 6 illustrates an example data structure that may be used to implement the example policy of FIG. 1.

FIG. 6 illustrates an example data structure that may be used to implement a portion of the example polices 145 of FIG. 1. To identify an access point to which a plurality of policies 605 apply, the example data structure of FIG. 6 includes an identifier field 610. The example identifier field 610 of FIG. 6 contains a value that uniquely identifies an access point 105A, 105B, such as a media access controller (MAC) address. The example identifier field 610 may alternatively contain a value that represents two or more access points 105A, 105B that utilize a common set of policies 605.

To specify bandwidth allocations, the example policies 605 of FIG. 6 include a plurality of bandwidth allocation rules 615 for respective ones of a plurality of time periods. To specify a time period, each of the example bandwidth allocation rules 615 of FIG. 6 includes a time period field 620. The example time period field 620 of FIG. 6 contains a value that represents a time-of-day, a time-of-day range, a day-of-week, multiple days-of-week, a day-of-week range, a day-of-year, etc.

To specify the rules for allocating bandwidth, each of the example rules 615 of FIG. 6 includes a private CIR field 625, a private PIR field 630, a public CIR field 635 and a public PIR field 640. The example CIR fields 625 and 635 of FIG. 6 contain a value that represents a continuous information rate (CIR) allocated to private and public users, respectively. Likewise, the example PIR fields 630 and 640 contain a value that represents a peak information rate (PIR) allocated to private and public users, respectively.

To identify blocked services and/or servers, the example policies 605 of FIG. 6 include a plurality of service and/or server identifiers fields 645. Each of the example identifier fields 645 contains a value that represents one or more services and/or servers to which access by public users is blocked. Example values include web addresses, uniform resource locators (URLs), IP addresses, etc.

While an example data structure that may be used to implement the example policies 145 of FIG. 1 is illustrated in FIG. 6, the example data structure may be implemented using any type of other and/or additional fields and/or data. Further, the fields and/or data illustrated in FIG. 6 may be combined, split, re-arranged, eliminated and/or implemented in any way. Moreover, the example data structure may include additional fields and/or data than those illustrated in FIG. 6 and/or may include more than one of any or all of the illustrated fields and/or data.

Figure 7:
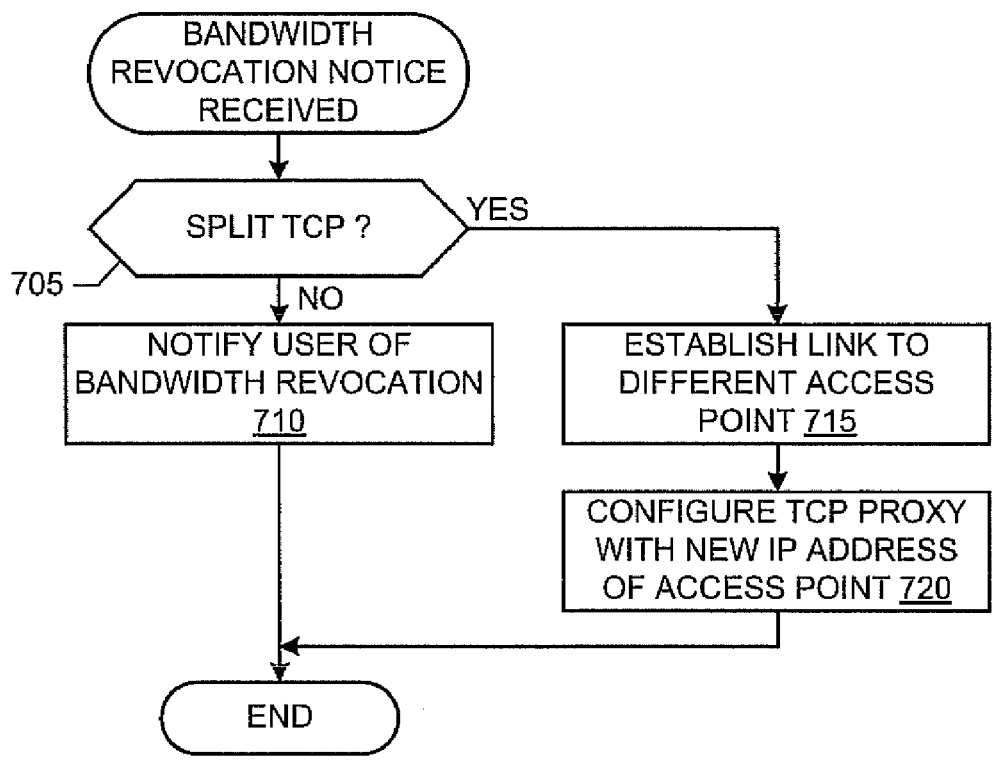
FIG. 7 is a flowchart representative of example machine accessible instructions that may be executed to implement any or all of the example bandwidth agents of FIGS. 1, 2 and/or 3.
Figure 8:
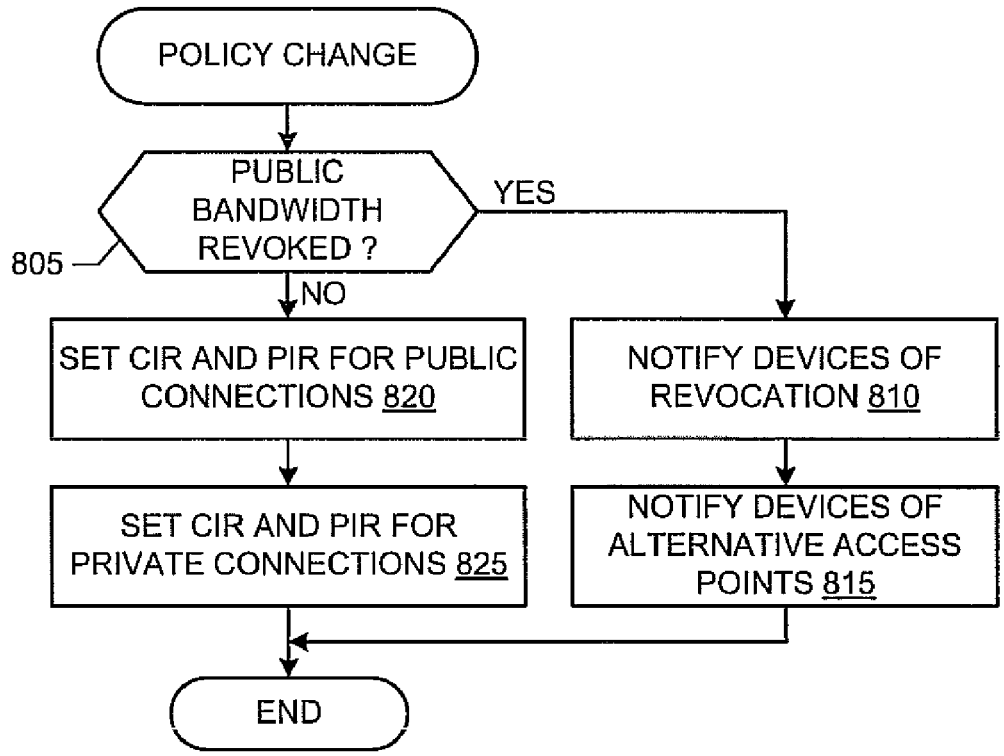
FIG. 8 is a flowchart representative of example machine accessible instructions that may be executed to implement the example policy manager of FIG. 4.
Figure 9:
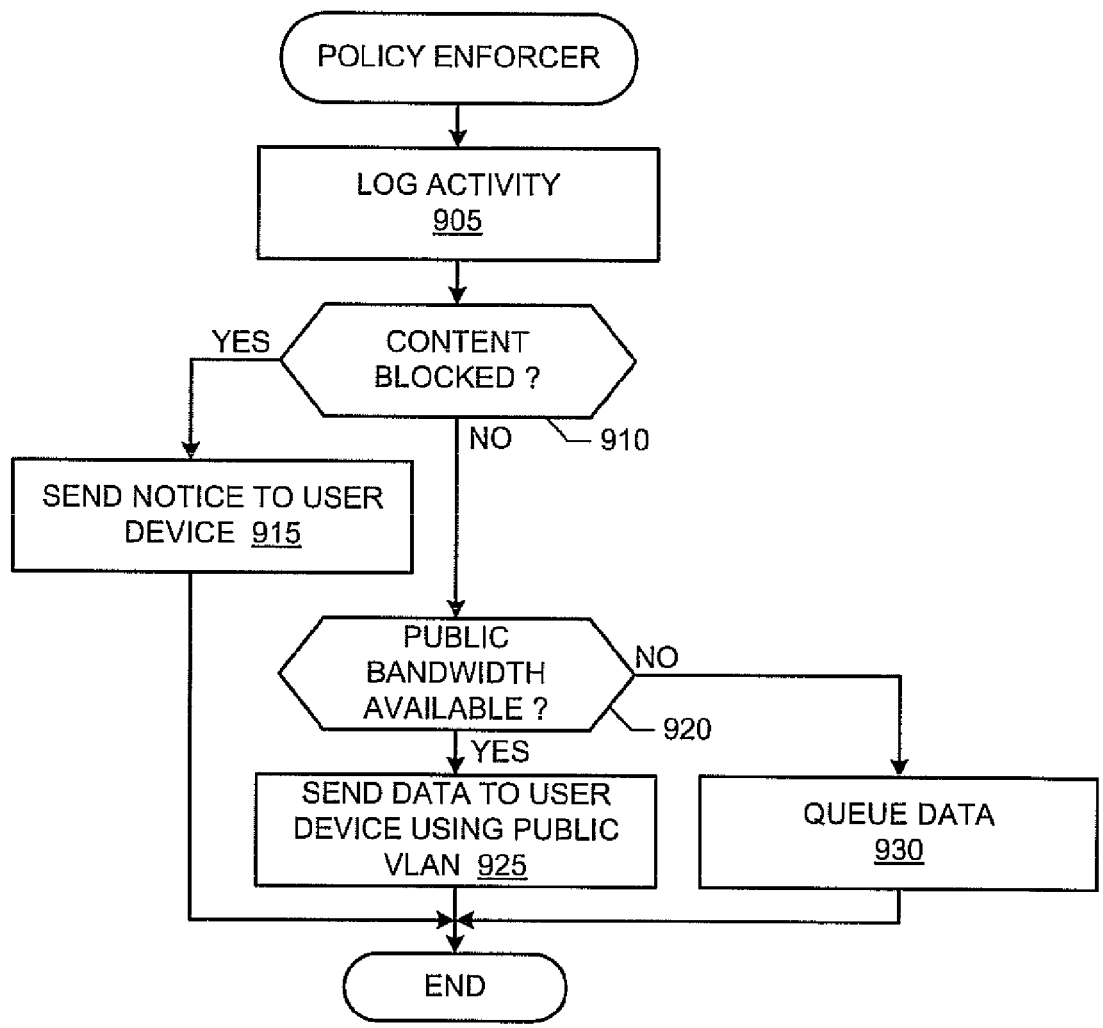
FIG. 9 is a flowchart representative of example machine accessible instructions that may be executed to implement the example bandwidth manager of FIG. 5.

FIGS. 7, 8 and 9 are flowcharts representative of example machine accessible instructions that may be executed to implement the example bandwidth agents 165, the example policy manager 140 and/or the example bandwidth manager 160 of FIGS. 1-5. The example machine accessible instructions of FIGS. 7, 8 and/or 9 may be executed by a processor, a controller and/or any other suitable processing device. For example, the example machine accessible instructions of FIG. 7, 8 and/or 9 may be embodied in coded instructions stored on a tangible medium such as a flash memory, a ROM and/or RAM associated with a processor (e.g., the example processor 225 of FIG. 2 and/or the example processor 1005 discussed below in connection with FIG. 10). Alternatively, some or all of the example flowcharts of FIGS. 7, 8 and/or 9 may be implemented using any combination(s) of ASIC(s), PLD(s), FPLD(s), discrete logic, hardware, firmware, etc. Also, some or all of the example flowcharts of FIGS. 7, 8 and/or 9 may be implemented manually or as any combination(s) of any of the foregoing techniques, for example, any combination of firmware, software, discrete logic and/or hardware. Further, although the example machine accessible instructions of FIGS. 7, 8 and 9 are described with reference to the flowcharts of FIGS. 7, 8 and 9, persons of ordinary skill in the art will readily appreciate that many other methods of implementing the example bandwidth agents 165, the example policy manager 140 and/or the example bandwidth manager 160 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 7, 8 and/or 9 may be carried out sequentially and/or carried out in parallel by, for example, separate processing threads, processors, devices, discrete logic, circuits, etc.

The example machine accessible instructions of FIG. 7 begin when a user device (e.g., more specifically, one of the example bandwidth agents 165 of FIGS. 1-3) receives a notice that bandwidth for public users is being revoked. If the bandwidth agent supports split TCP and an alternative access point is available (block 705), the bandwidth agent (e.g., more specifically, the example bandwidth controller 315 of FIG. 3) establishes a link to a different access point (block 710) and configures a TCP proxy (e.g., the example TCP proxy 305) with the new IP address assigned to the user device for the newly established link (block 715). Control then exits from the example machine accessible instructions of FIG. 7.

Returning to block 705, if either bandwidth agent does not support split TCP or an alternative access point is not available (block 705), the bandwidth agent (e.g., more specifically, the example notifier 310 of FIG. 3) notifies that user that a public communication session is no longer available (block 710). Control then exits from the example machine accessible instructions of FIG. 7.

The example machine accessible instructions of FIG. 8 begin when a server (e.g., the example policy manager 140 and/or the example BRAS 130 of FIG. 1) receives a policy change. The policy change may occur in response to a configuration change by an owner and/or operator, and/or based on a time-of-day, day-of-week and/or day-of-year. If the policy change indicates that bandwidth for public connections is being revoked (block 805), the server (e.g., the example enforcer 505 of FIG. 5), notifies affected user devices (block 810) and notifies the affected user devices of alternative access points when available (block 815). Control then exits from the example machine accessible instructions of FIG. 8.

Returning to block 805, if bandwidth for public connections is being modified (block 805), the server (e.g., the example bandwidth allocator 415 of FIG. 4 and/or the example enforcer 505 of FIG. 5) determines, sets and/or loads the CIR and PIR for public connections based on the updated policy (block 820) and sets the CIR and PIR values for private connections based on the updated policy (block 825). Control then exits from the example machine accessible instructions of FIG. 8.

The example machine accessible instructions of FIG. 9 begin when data destined for a public user is received at an access server (e.g., the example BRAS 130 of FIG. 1). The access server (e.g., the example logger 515 of FIG. 5) logs the activity (block 905). The access server (e.g., the example screener 510) determines if the data is associated with a blocked service and/or server (block 910). If the data is associated with a blocked service and/or server (block 910), the screener sends a notice to the destination that access to the service and/or server has been blocked (block 915). Control then exits from the example machine accessible instructions of FIG. 9.

Returning to block 910, if the data is not associated with a blocked service and/or server (block 910), the access server (e.g., the example enforcer 505 of FIG. 5) determines if sufficient public bandwidth is available to transport the data (block 920). For example, the enforcer ensures that transport of the data would not violate a CIR and/or PIR value assigned to public sessions and ensures that transport of the data would not keep private users from utilizing the CIR assigned to private sessions. If sufficient public bandwidth is available (block 920), the access server sends the data to the user device using the public vLAN (block 925). If sufficient public bandwidth is not available (block 920), the access server queues the data for sending at a later time (block 930). Control then exits from the example machine accessible instructions of FIG. 9.

Figure 10:
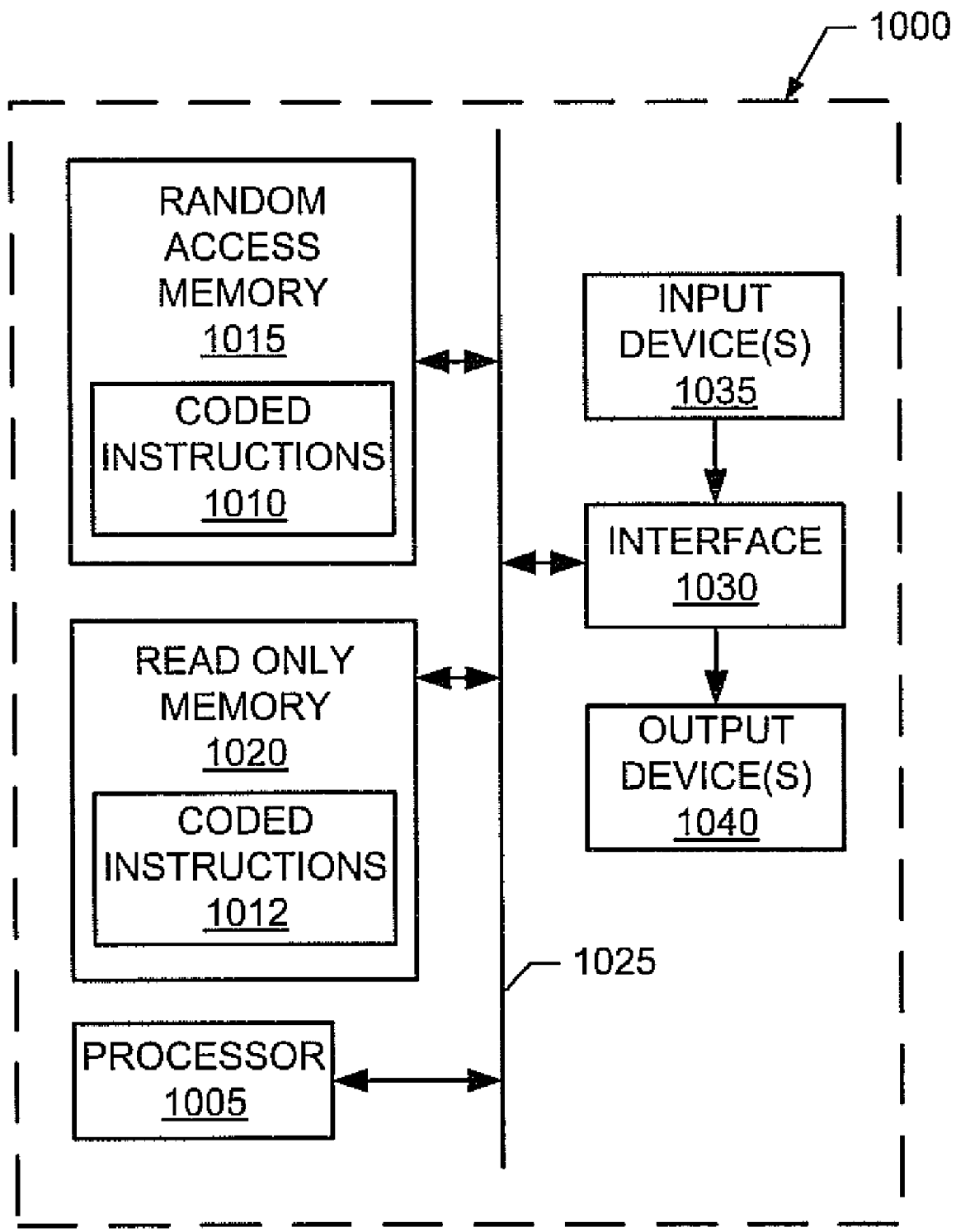
FIG. 10 is a schematic illustration of an example processor platform that may be used and/or programmed to execute the example machine readable instructions represented by FIGS. 7, 8 and/or 9 to implement the example bandwidth agents, the example policy manager and/or the example bandwidth manager described herein.

FIG. 10 is a schematic diagram of an example processor platform 1000 that may be used and/or programmed to implement all or a portion of the example access points 105A, 105B, the example user devices 110A-D, the example bandwidth agents 165, the example BRAS 130, the example bandwidth manager 160 and/or the example policy manager 140 described herein. For example, the processor platform 1000 can be implemented by one or more general purpose processors, processor cores, microcontrollers, etc.

The processor platform 1000 of the example of FIG. 10 includes at least one general purpose programmable processor 1005. The processor 1005 executes coded instructions 1010 and/or 1012 present in main memory of the processor 1005 (e.g., within a RAM 1015 and/or a ROM 1020). The processor 1005 may be any type of processing unit, such as a processor core, a processor and/or a microcontroller. The processor 1005 may execute, among other things, the example machine accessible instructions of FIGS. 7, 8 and/or 9. The processor 1005 is in communication with the main memory (including a ROM 1020 and/or the RAM 1015) via a bus 1025. The RAM 1015 may be implemented by DRAM, SDRAM, and/or any other type of RAM device, and ROM may be implemented by flash memory and/or any other desired type of memory device. Access to the memory 1015 and 1020 maybe controlled by a memory controller (not shown). The RAM 1015 may be used to store and/or implement, for example, the policies 145 of FIG. 1.

The processor platform 1000 also includes an interface circuit 1030. The interface circuit 1030 may be implemented by any type of interface standard, such as an external memory interface, serial port, general purpose input/output, etc. One or more input devices 1035 and one or more output devices 1040 are connected to the interface circuit 1030. The input devices 1035 and/or output devices 1040 may be used to, for example, the keypad interface 270, the display interface 277, the network interface 215 of FIG. 2, the example policy interface 410 of FIG. 4, and/or one or more interfaces between any or all of the example BRAS 130, the example policies 145, the example bandwidth manager 160, the example policy manager 140 and/or the example operator 150.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. For a wireless network that includes a wireless access point supporting a private service set identifier and a public service set identifier, an apparatus comprising:
    a policy interface to receive a first value corresponding to a permissible public bandwidth accessible collectively by a group of user devices via the public service set identifier and a second value corresponding to a private bandwidth accessible via the private service set identifier; and
    a bandwidth allocator to determine whether the permissible public bandwidth associated with the public service set identifier is not greater than the first value and the private bandwidth associated with the private service set identifier is not less than the second value to determine whether to allocate usage of the permissible public bandwidth wherein the bandwidth allocator and the policy interface are physically separate from the wireless access point.

2. An apparatus as defined in claim 1, wherein the policy interface is configured to allow an operator of the access point to configure at least one of the first value or the second value.

3. An apparatus as defined in claim 1, wherein when an available public bandwidth is substantially zero, the bandwidth allocator is configured to notify a user device of the wireless access point that access to public bandwidth via the access point is blocked.

4. An apparatus as defined in claim 3, wherein when access to the public bandwidth is blocked, the bandwidth allocator is to notify the user device that access to the wireless communication system using the public service set identifier may occur via a second access point of the wireless communication system.

5. An apparatus as defined in claim 3, further comprising a transmission control protocol splitter to enable the user device to respond to disconnection from the access point by re-connecting to the wireless communication system via a second access point without having to re-configure an Internet protocol address utilized at the user device.

6. An apparatus as defined in claim 1, wherein the bandwidth allocator controls usage of the permissible public bandwidth based on utilization of the private bandwidth.

7. An apparatus as defined in claim 6, wherein usage of the permissible public bandwidth is enforced at a broadband remote access server, communication sessions utilizing the public and the private service set identifiers occur via a shared communication path between the wireless access point and the broadband remote access server, and the permissible public bandwidth represents a portion of the shared communication path allocated to the public service set identifier.

8. An apparatus as defined in claim 6, wherein a first communication session utilizing the public service set identifier is transported in a first virtual local area network and a second communication session utilizing the private service set identifier is transported in a second virtual local area network.

9. An apparatus as defined in claim 1, further comprising an activity logger to record an access to a service via the public service set identifier.

10. An apparatus as defined in claim 1, wherein the policy interface is configured to allow the operator to configure a content screening parameter for the public service set identifier.

11. An apparatus as defined in claim 1, wherein the permissible public bandwidth is associated with data transmitted by the wireless access point to a user device.

12. A method comprising:
    configuring a permissible public bandwidth associated with a public service set identifier and a private bandwidth associated with a private service set identifier for a communication path between a broadband remote access server and a wireless access point based upon a policy;
    establishing a communication session that utilizes the public service set identifier to access the wireless access point to establish a first communication link to implement the communication session, the communication session to employ translation between a first Internet protocol address used by a user device to communicate with the wireless access point and a second Internet protocol address used by a client application of the user device to communicate with a network resource via the communication session, the first Internet protocol address being unknown to the client application and replaceable with a third Internet protocol address corresponding to a second communication link without notifying the client application to enable the communication session between the client application and the network resource to continue after the first communication link is terminated; and
    terminating the first communication link to enforce the private bandwidth configured for the communication path between the broadband remote access server and the wireless access point, the private bandwidth being accessible collectively by a group of private users via the private service set identifier, the private bandwidth enforced based on a first value representative of the private bandwidth and a second value representative of the permissible public bandwidth configured for the communication path, the permissible public bandwidth being accessible collectively by a group of public users via the public service set identifier.

13. A method as defined in claim 12, wherein the communication paths is from the broadband remote access server to the wireless access point.

14. A method as defined in claim 12, wherein the policy defines at least one of a committed information rate or a peak information rate for the communication path.

15. A method as defined in claim 12, further comprising notifying the user device of a second wireless access point that may be used to establish the second communication link utilizing the public service set identifier.

16. A tangible article of manufacture storing machine accessible instructions which, when executed, cause a machine to at least:
 configure a permissible public bandwidth associated with a public service set identifier and a private bandwidth associated with a private service set identifier for a communication path between a broadband remote access server and a wireless access point based upon a policy;
 establish a communication session that utilizes the public service set identifier to access the wireless access point to establish a first communication link to implement the communication session, the communication session to employ a first Internet protocol address for a user device to communicate with the wireless access point and a second Internet protocol address for a client application of the user device to communicate with a network resource via the communication session, the first Internet protocol address being unknown to the client application and replaceable with a third Internet protocol address corresponding to a second communication link without notifying the client application to enable the communication session between the client application and the network resource to continue after the first communication link is terminated; and
 enforce the private bandwidth configured for the communication path between the broadband remote access server and wireless access point by terminating the first communication link, the private bandwidth being shareable among a group of private users via the private service set identifier, the private bandwidth enforced based on a first value representative of the private bandwidth and a second value representative of the permissible public bandwidth configured for the communication path, the permissible public bandwidth being shareable among a group of public users via the public service set identifier.

17. A tangible article of manufacture as defined in claim 16, wherein the policy defines at least one of a committed information rate or a peak information rate for the communication path.

18. A tangible article of manufacture as defined in claim 16, wherein the machine accessible instructions, when executed, cause the machine to notify the user device of a second wireless access point that may be used to establish the second communication link utilizing the public service set identifier.

* * * * *